US005904874A

United States Patent [19]

Winter

[11] Patent Number: 5,904,874

[45] Date of Patent: May 18, 1999

[54] RESISTANCE HEATING DEVICE FOR FLAT OBJECTS SUCH AS MIRRORS

[76] Inventor: Josef Winter, Im Gabis 2a, 85296 Rohrbach, Germany

[21] Appl. No.: 08/948,518

[22] Filed: Oct. 10, 1997

[30] Foreign Application Priority Data

Mar. 19, 1997 [DE] Germany .......................... 197 11 522

[51] Int. Cl.[6] .............................. H05B 3/44; H05B 1/00; B60L 1/02

[52] U.S. Cl. .......................... 219/544; 219/219; 219/203; 338/314

[58] Field of Search .................................... 219/219, 522, 219/543, 203; 338/306, 307, 308, 309, 314; 392/432, 433, 434, 435, 438, 439

[56] References Cited

U.S. PATENT DOCUMENTS

| | | | |
|---|---|---|---|
| 3,475,588 | 10/1969 | McMaster . | |
| 4,634,242 | 1/1987 | Taguchi et al. . | |
| 4,686,354 | 8/1987 | Makin | 219/301 |
| 4,940,317 | 7/1990 | Reuben | 350/588 |
| 5,100,494 | 3/1992 | Schmidt | 156/344 |
| 5,132,840 | 7/1992 | Okada et al. | 359/512 |
| 5,270,517 | 12/1993 | Finley | 219/203 |
| 5,374,807 | 12/1994 | Yahav et al. | 219/464 |
| 5,380,981 | 1/1995 | Feldman et al. | 219/219 |
| 5,408,069 | 4/1995 | Mischel, Jr. . | |
| 5,414,241 | 5/1995 | Ohashi et al. | 219/219 |
| 5,587,097 | 12/1996 | Sato et al. | 219/543 |
| 5,716,536 | 2/1998 | Yokoto et al. | 219/219 |

FOREIGN PATENT DOCUMENTS

| | | |
|---|---|---|
| 1 986 611 | 3/1968 | Germany . |
| 2 207 230 | 9/1972 | Germany . |
| 81 02 846 | 2/1981 | Germany . |
| 2263556 | 7/1993 | United Kingdom . |

OTHER PUBLICATIONS

Abstracts of Japan, vol. 5, No. 28, May 30, 1997, JP 09–000 405, Jan. 7, 1997.

Abstracts of Japan, vol. 3, No. 26, Mar. 31, 1997, JP 08 306 472, Nov. 22, 1996.

*Primary Examiner*—Teresa Walberg
*Assistant Examiner*—Daniel Robinson
*Attorney, Agent, or Firm*—Oblon, Spivak, McClelland, Maier & Neustadt, P.C.

[57] ABSTRACT

A mirror heater which is suitable for bathrooms and humid spaces includes electrically insulating layers which are partially provided by double-sided adhesive tapes. The double-sided adhesive tapes fix the various layers to one another and provide an insulative layer.

10 Claims, 1 Drawing Sheet

18 16 17 15 8 9 7 21 23 22 14 12 6 4 2 1 3 20 25 26 27

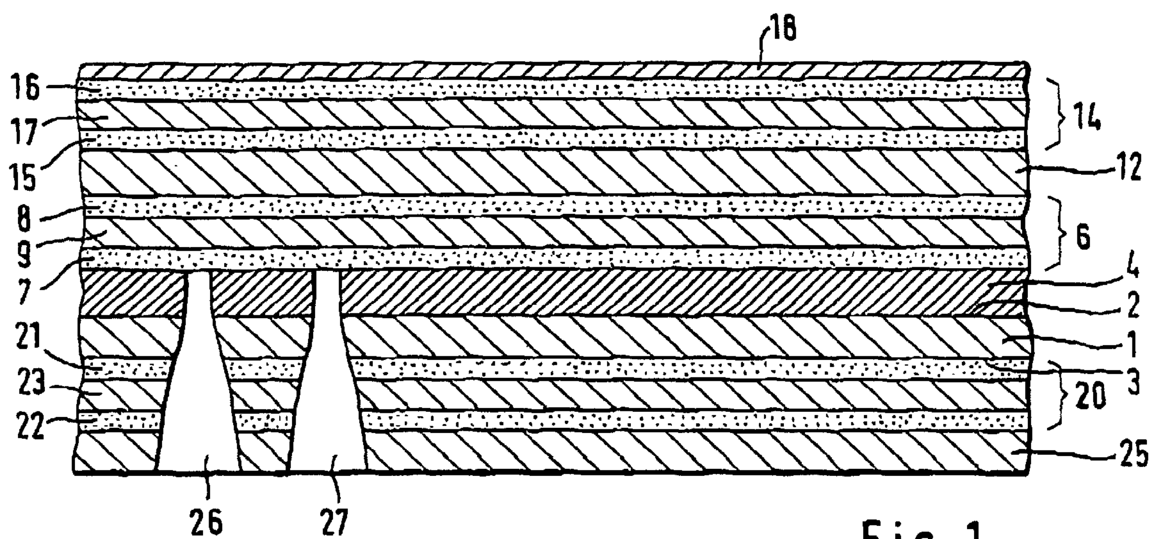
Fig. 1
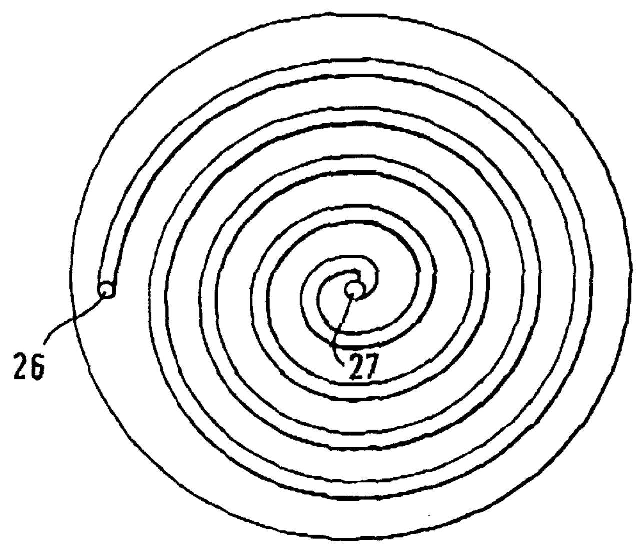
Fig. 2
Fig. 3
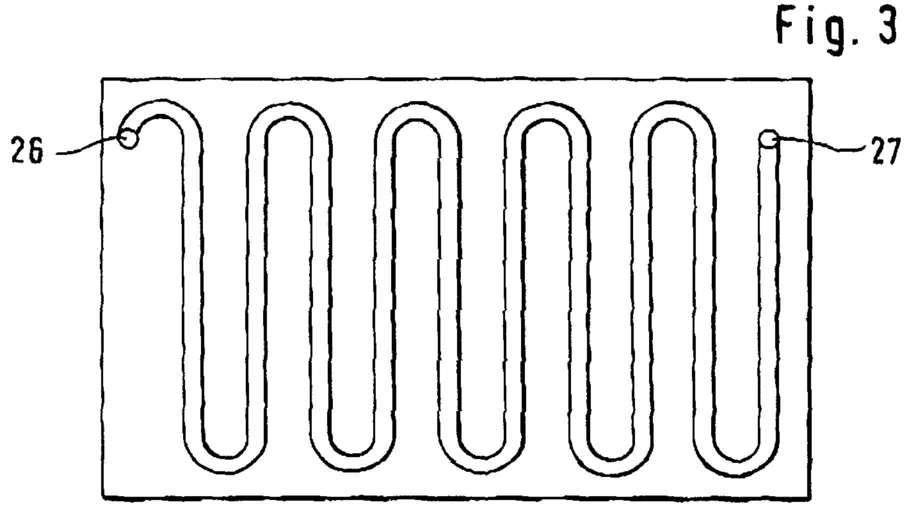

RESISTANCE HEATING DEVICE FOR FLAT OBJECTS SUCH AS MIRRORS

BACKGROUND OF THE INVENTION

1. Field of the Invention

The invention relates to a resistance heating device for flat objects such as mirrors.

2. Discussion of the Background

Mirror surfaces often steam up following showering or bathing which prevents the mirrors from fulfilling their function. In order to keep a mirror from steaming up it is known to heat the mirror surface from the rear with heating layers so that the surface does not steam up, even in high air humidity. However, these heating devices have been restricted in countries that impose high safety requirements. For mirror heaters, this may mean that the power-carrying elements, i.e., the heating elements, must be safeguarded by insulating layers which are separated from one another. For example, embedding a serpentine resistance heater between three insulating layers separated from one another on both sides leads to a comparatively thick construction, which in turn results in less efficient heating. The large overall height and the loss of efficiency have kept flat heating devices of this type from becoming widespread, particularly for mirrors.

SUMMARY OF THE INVENTION

Accordingly, one object of this invention is to provide a resistance heating device which has a low overall height and satisfies the safety requirements of the German Technical Inspection Authority (TÜV).

A plurality of double-sided adhesive tapes and an intermediate layer made of insulating material arranged between two adhesive layers provides an insulation layer with a high breakdown voltage. The overall height increase is small since the double-sided adhesive tapes perform both a retaining or adhesive function and an insulative function. The physical integration of adhesion and insulation results in a significantly lower overall height while achieving an adequate transfer of heat to the flat object such as a bathroom mirror. At the same time, the safety requirements of the TÜV are fulfilled.

According to an advantageous feature of the invention, the heating layer can be connected directly to the mains or to a power source by feed lines. This means that the resistance heater is designed in accordance with the available operating voltage, e.g., 230 volts, 12 volts, or 4 volts. Thus, the resistance heater can be connected directly to the power source and furnish the desired heating power. Since regulating devices of any kind are not necessary, a cost-effective design is achieved.

According to an advantageous feature of the invention, an ON/OFF switch is provided in the feed line because the air humidity and the temperature conditions in the bathroom are not always such that they cause the mirror to steam up. The mirror heater can therefore be switched on as required.

According to another advantageous feature of the invention, temperature and/or moisture sensors are provided. The sensors can cause the mirror heaters to be switched on or off when the temperature or moisture exceeds or falls below appropriate threshold values. The temperature and moisture sensors can be arranged directly in the mirror surface, on the mirror surface, or close to the mirror.

According to one particularly advantageous embodiment of the invention, the second adhesive layer of the second double-sided adhesive tape is covered with a protective film that can be pulled off, permitting the heating device to be packed, despatched, and handled in any manner before being fitted to the mirror.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a sectional illustration through the layers of an exemplary embodiment of the invention;

FIG. 2 shows a top view of the resistance heater in the case of a round mirror; and FIG. 3 shows a top view of the resistance heater in the case of a rectangular mirror.

DESCRIPTION OF THE PREFERRED EMBODIMENTS

Referring now to the drawings, wherein like reference numerals designate identical or corresponding parts throughout the several views, and more particularly to FIG. 1, thereof, an electrically insulating substrate 1 has a first main surface 2 and a second main surface 3. A flat resistance heating layer 4 made of a material with a known electrical resistance is applied to the first main surface 2 of the substrate 1. The resistance heating layer 4 is covered by a first double-sided adhesive tape 6 with first and second adhesive layers 7 and 8, respectively, and an insulating intermediate layer 9. In this case, the first adhesive layer 7 contacts the resistance heating layer 4. The second adhesive layer 8 of the first double-sided adhesive tape 6 is connected to one side of a first insulation layer 12. The other side of the insulation layer 12 is connected to a double-sided adhesive tape 14 with first and second adhesive layers 15 and 16, respectively, and an insulating intermediate layer 17. In this case, the first adhesive layer 15 contacts the first insulation layer 12. A protective film 18 that can be pulled off is arranged on the second adhesive layer 16 of the second double-sided adhesive tape 14. The second main surface 3 of the electrically insulating substrate 1 is connected to a third double-sided adhesive tape 20, which has first and second adhesive layers 21 and 22, respectively, and an insulating intermediate layer 23. In this case, the first adhesive layer 21 is connected to the second main surface 3 and the second adhesive layer 22 is connected to a second insulation layer 25. Electric connection points 26 and 27 penetrate the second insulation layer 25, the third double-sided adhesive tape 20 and the substrate 1 from the second insulation layer 25, and make contact with corresponding connections on the resistance heating layer 4.

The resistance heater according to the invention and according to FIG. 1 can be connected to the object or mirror to be heated immediately following its production, with the result that a mirror with resistance heating is delivered as a single package to the market. When the protective film 18 is used, existing mirrors can be equipped with resistance heaters. Since the appropriate TÜV regulations are satisfied by the triple insulation layer on both sides, the resistance heater according to the invention can also be sold in Do-It-Yourself stores to laymen, i.e., directly to the final user. The resistance heater according to the invention is preferably constructed so that it can be connected directly to the mains in the household via silicone-insulated feed lines. In this case the connection can be made through a distribution box or by a standard plug.

FIG. 2 shows a round resistance heater according to the invention wherein the heating elements of the resistance heating layer 4 are spiral. FIG. 3 shows a rectangular resistance heater for rectangular mirrors. In this case, the heating elements of the resistance heater 4 are arranged in serpentine fashion. The serpentine configuration of the resistance heater 4 may also be applied to round mirrors and mirrors of other shapes, and the spiral configuration may also be applied to rectangular mirrors and mirrors of other shapes.

The adhesive layers of the double-sided adhesive tapes 6, 14, and 20 are preferably acrylate adhesives, synthetic rubber, or natural rubber. The electrically insulating substrate 1, the first and second insulation layers 12 and 25, and the intermediate layers 9, 17, and 23 of the double-sided adhesive tapes 6, 14, and 20, are flexible plastic films having a thickness in the range from 0.008 mm. to 0.09 mm. The electric breakdown strength of the individual insulating layers is preferably at least 2000 volts. The resistance heating layer 4 consists of an electrically conductive material having a specific electrical resistance. For a given supply voltage, the necessary heating power is achieved by adjusting the dimensions of the heating elements. The material of the heating elements may consist of, for example, copper, silver, aluminum or other conductive alloys and substances. The heating elements may also be PTC elements, i.e., elements made of a material having a positive resistance/temperature coefficient. This provides additional safety since PTC elements are self-regulating.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters: Patent of the United States is:

1. A resistance heating device for flat objects comprising:

a flat, electrically insulating substrate having a first main surface and a second main surface, said flat electrically insulating substrate forming a first electrically insulating layer;

a heating layer arranged on the first main surface;

a first double-sided adhesive tape layer having a first adhesive layer attached to said heating layer, a second adhesive layer, and a first intermediate layer made of an electrically insulating material between the first and second adhesive layers, said first intermediate layer forming a second electrically insulating layer;

a first insulation layer attached to the second adhesive layer of the first double-sided adhesive tape, said first insulation layer forming a third electrically insulating layer;

a second double-sided adhesive tape layer having a third adhesive layer attached to the first insulation layer, a fourth adhesive layer, and a second intermediate layer made of electrically insulating material between the third and fourth adhesive layers, said second intermediate layer forming a fourth electrically insulating layer;

a third double-sided adhesive tape layer having a fifth adhesive layer attached to the second main surface of the electrically insulating substrate, a sixth adhesive layer, and a third intermediate layer made of electrically insulating material between the fifth and sixth adhesive layers, said third intermediate layer forming a fifth electrically insulating layer; and a second insulation layer attached to the sixth adhesive layer of the third double-sided adhesive tape, said second insulation layer forming a sixth electrically insulating layer.

2. The resistance heating device according to claim 1, wherein the heating layer is connected to a power source by feed lines.

3. The resistance heating device according to claim 2, wherein the feed lines are silicone-insulated.

4. The resistance heating device according to claim 2, wherein an on/off switch is provided in the feed lines.

5. The resistance heating device according to claim 2, further comprising a moisture sensor and a switching device for disconnecting an electrical connection between the power source and the heating layer when the moisture level exceeds a threshold.

6. The resistance heating device according to claim 2, further comprising a temperature sensor and a switching device for disconnecting an electrical connection between the power source and the heating layer when the temperature exceeds a threshold.

7. The resistance heating device according to claim 1, wherein the fourth adhesive layer is covered by a protective film.

8. The resistance heating device of claim 1, wherein the fourth adhesive layer is attached to an object to be heated.

9. The resistance heating device according to claim 1, wherein the first, second, third, fourth, fifth, and sixth electrically insulating layers are each formed of a flexible plastic film having a thickness of from 0.008 millimeters to 0.09 millimeters.

10. The resistance heating device according to claim 1, wherein the first, second, third, fourth, fifth, and sixth electrically insulating layers are each formed of a flexible plastic film having an electric breakdown strength of at least 2000 volts.

* * * * *